May 17, 1949.   J. B. OLSON   2,470,637
FEED TRUCK AND MEANS FOR REMOVING FEED THEREFROM
Filed May 14, 1947   3 Sheets-Sheet 1

INVENTOR.
JOHN B. OLSON
BY   A. S. Krob
ATTORNEY

May 17, 1949. J. B. OLSON 2,470,637
FEED TRUCK AND MEANS FOR REMOVING FEED THEREFROM
Filed May 14, 1947 3 Sheets-Sheet 2

INVENTOR.
JOHN B. OLSON
BY A. S. Krob
ATTORNEY

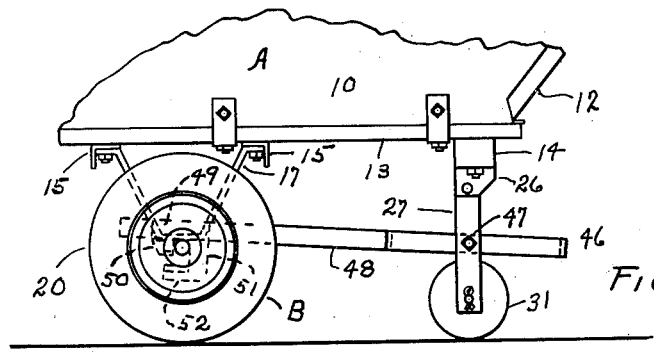
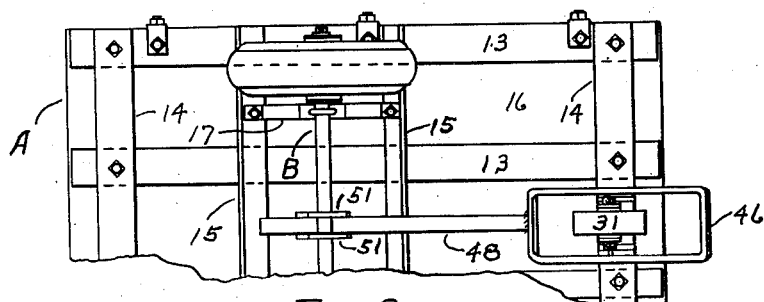
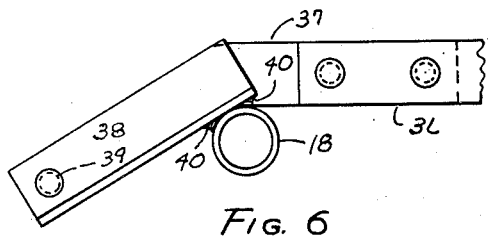
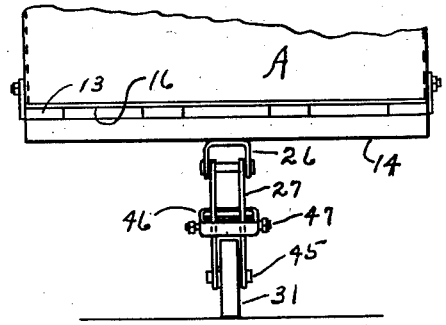
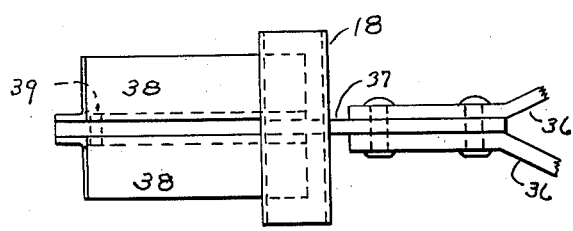

Patented May 17, 1949

2,470,637

UNITED STATES PATENT OFFICE 2,470,637

FEED TRUCK AND MEANS FOR REMOVING FEED THEREFROM

John B. Olson, Fort Atkinson, Wis., assignor to James Manufacturing Company, Fort Atkinson, Wis., a company of Wisconsin Application May 14, 1947, Serial No. 747,930

6 Claims. (Cl. 280—43)

The present invention relates to feed trucks adapted to be used for distributing feed, such as silage, chopped hay, etc., and is especially adapted for this use in dairy barns where the floor or alley ways are narrow and the feed is distributed by a fork or shovel as the truck is moved forward.

A feature of my improved feed truck is that low rubber tired carrying wheels are positioned under the feed box for the purpose next above outlined and wherein these wheels are near the longitudinal center of gravity when the truck is loaded, partially loaded or empty.

An object of the present invention is to provide a rear carrying wheel or wheels which normally hold the box in a horizontal longitudinal position and having means whereby the rear wheel or wheels may be optionally moved rearwardly and upwardly so as to permit the box to tip back making it easier for the operator to fork or shovel feed from the box and so the feed will move rearwardly and keep within easy reach of the operator until the box is empty.

An object of the present invention is to make it possible for the operator to push the truck forward by means of the fork or shovel while unloading so the operator's hands are free to handle the fork or shovel while moving the truck along and unloading, thus to distribute the feed by almost a continuous forward movement.

Still another object of the present invention is to eliminate swivel or caster wheels at the operator's end of the truck so when the truck is once in line with the feed mangers it can be pushed along with the fork or shovel by the operator while unloading.

Another object of the present invention is to provide means whereby when the box is empty the operator can easily lift it to a horizontal position and permit the rear wheel or wheels to again assume their normal position.

To these and other useful ends my invention consists of parts, combinations of parts or their equivalents and mode of operation as hereinafter described and claimed and shown in the accompanying drawings in which:

Fig. 6 is a detail view of the preferred design of locking mechanism for the rear wheels.

Fig. 7 is a bottom view of the device as shown in Figure 6.

Fig. 8 is a fractional side elevational view of the device when equipped with a single rear carrying wheel.

Fig. 9 is a bottom view of the device as shown in Figure 8.

Fig. 10 is a rear fractional view of the device shown in Figure 8.

Figure 1:
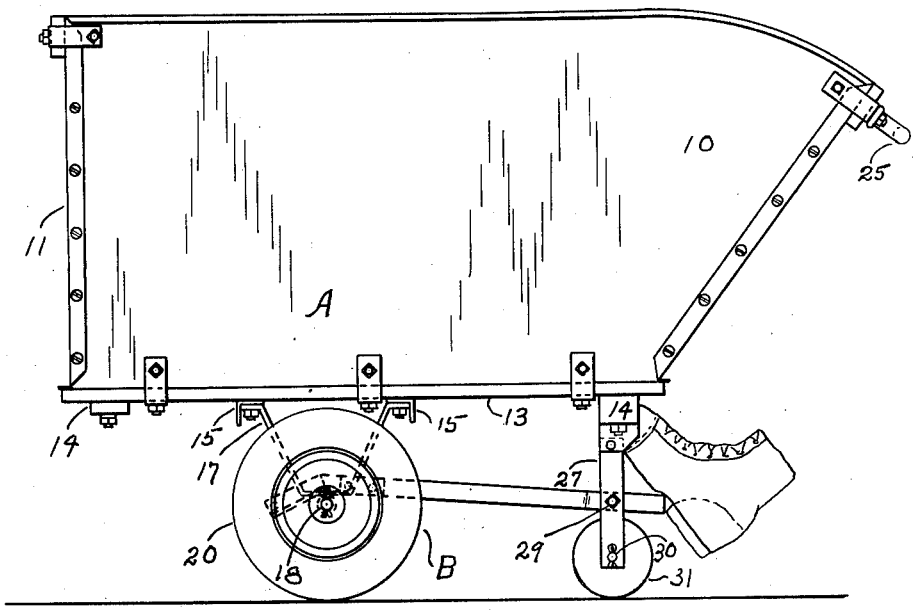
Fig. 1 is a side elevational view of my improved feed truck.

As thus illustrated the feed box of my device is in its entirety, designated by reference character A. The front wheels and their mountings are in their entireties designated by reference character B. Feed box A is designed as illustrated having side panels 10—10 with a front panel 11 and a rear panel 12. Box A has preferably spaced longitudinal sills 13 to which the bottom panel 16 of the box is secured, the sills being connected together by means of transverse beams 14—14 and transverse angle bars 15—15 to which spaced V-shaped brackets 17 are secured as clearly illustrated in Figures 1, 2 and 3. Front axle 18 is secured to members 17 as at 19 on the end of which preferably rubber tired wheels 20—20 are mounted.

It will be seen that the front supporting means is adequately secured to the box and that axle 18 is near the longitudinal center of the bottom of the box so that normally there is very little weight on the rear carrying wheels, thus making it possible for the operator to easily lift the rear end of the box by means of hand rail 25 for maneuvering and moving about, wheel-barrow fashion. Rear supporting means are provided because while unloading the box the operator must use both hands for handling the shovel or fork. Some material may be removed from the box while it is in the position shown in Figure 1; however, one of the objects of the present invention is to make it convenient for unloading the material by positioning the box as shown in Figure 2.

Figure 5:
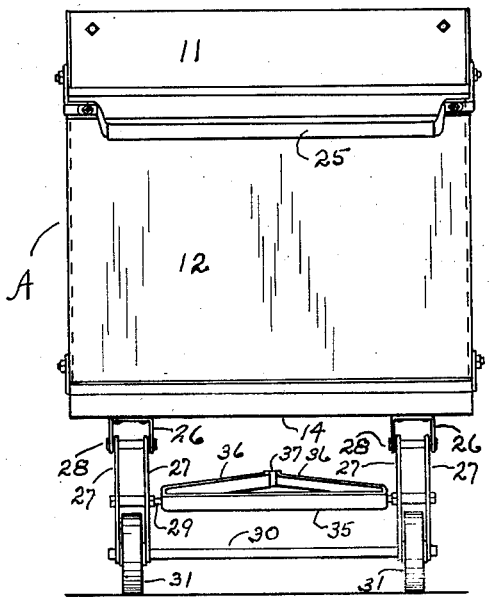
Fig. 5 is a rear view of the device as shown in Figure 1.

I will now describe my improved method for supporting the box in either position. Inverted U-shaped brackets 26—26 (see Figure 5) are secured to the rear transverse beam 14. Pairs of spaced arms 27—27 are hinged at their tops to brackets 26 as at 28—28, the arms being secured together by means of a shaft 29. An axle 30 extends through the lower ends of arms 27 and on this axle and between arms 27 I mount rear carrying wheels 31—31. When arms 27 depend downward as illustrated in Figure 1 box A will be held in a horizontal position.

I provide means for holding arms 27 in the position shown in Figure 1 as follows:

An element 35 is provided through which shaft 29 extends having forwardly converging side members 36—36. On the forward ends of element 36 I secure preferably a goose neck 37 which lies freely between angle bars 38—38 and being pivoted at its front end to the front end of members 38 as at 39. The rear ends of members 38 are preferably welded to member 18 as at 40—40. Member 18, it will be noted, is shown as a tube and is preferably rotatably mounted at 19.

Figure 2:
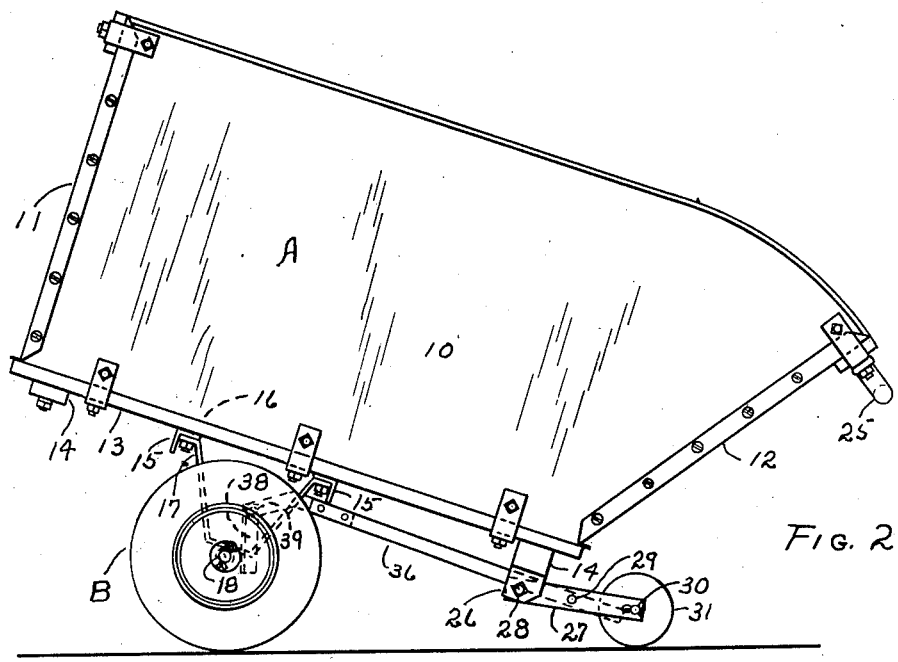
Fig. 2 is a view similar to Figure 1 except with the rear wheels moved rearwardly and upwardly on their arms so as to make it convenient for forking or shoveling feed from the box.
Figure 3:
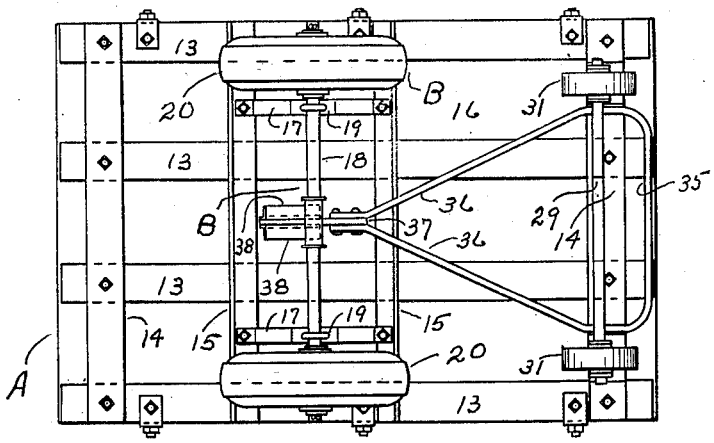
Fig. 3 is a fractional bottom view of the device as illustrated in Figure 1.
Figure 4:
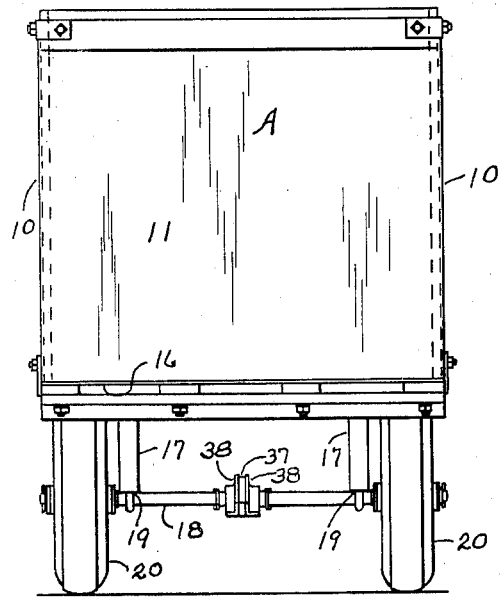
Fig. 4 is a front view of the device as illustrated in Figure 1 except that the rear wheels and their supporting brackets are not shown.

Thus clearly when members 37 and 38 are in the position shown in Figures 1, 4, 6 and 7, shaft 29 will be locked in this position; however, if the operator places his foot on the rear end of member 35 as illustrated in Figure 1, and presses downward slightly, the axle will be released permitting arms 27 to assume the position shown in Figure 2.

It will be noted that when the rear wheels are in the position shown in Figure 2 the truck can be maneuvered around and moved forward as conveniently as when the box is in the position shown in Figure 1. When the box is empty, all that is necessary to return it to the position shown in Figure 1 is to lift on member 25 so wheels 31 may return to the position shown in Figure 1.

In Figures 8, 9 and 10, I illustrate a modification wherein a single wheel only is used in the rear as clearly illustrated in these figures. Brackets 26 are similar and members 27 are similar except these members are positioned at the transverse center of the box (see Figure 10). A single wheel 31 is rotatably mounted on the lower ends of members 27 by means of a bolt 45. An element 46 whose purpose is similar to element 35, is pivoted to arms 27 by a bolt 47 and having a forwardly extending member 48 (see Figures 8 and 9) which may be shaped at its front end similar to member 37 and pivotally mounted on the front ends of members 38 as at 39 whereby the operation of the device is exactly the same as that shown in the other figures and will accomplish exactly the same results.

I may however use the design shown by dotted lines in Figure 8 and full lines in Figure 9, wherein one or two plates 49 are secured to member 48 having depending members which are shaped as shown in Figure 8 by dotted lines, comprising a front depending member 50 and a rear depending member 51. Member 51 has at its lower end a forwardly extending member 52 whereby axle 18 will be loosely engaged by members 50 and 51 with member 48 resting on the axle and with member 52 positioned a distance below the axle; thus when foot pressure is applied to the rear end of member 46, member 48 will rise until member 52 contacts the axle after which member 48 may move rearward thus to lower the rear end of the box as shown in Figure 2.

Clearly many minor detail changes in the design shown may be made without departing from the spirit and scope of the appended claims.

Having thus shown and described my invention, I claim:

1. A feed truck of the character described comprising, a feed box the rear panel of the feed box being rigidly secured to the side panels, and positioned obliquely upwardly and rearwardly near a 45 degree angle to the bottom of the box, two transversely spaced carrying wheels rotatably mounted on said box forward of the longitudinal center thereof, transversely spaced arms transversely hinged at their upper ends to the rear bottom corners of the box, relatively small carrying wheels transversely rotatably mounted on the lower ends of said arms, a controlling element hinged to said arms a distance from the hinges thereof and extending forwardly a distance, means on the forward end of said controlling element for locking the arms in a vertical position, means for manually unlocking said locking means to permit said relatively small wheels to swing upwardly on the arm pivots as an axes and thereby lower the rear end of the box for shoveling or forking material from the box.

2. A device as recited in claim 1 including, said carrying wheels being mounted on an axle which is supported on brackets attached to the box, said locking means comprising a crank mounted on the axle, said controlling element at its forward end being bent downward slightly and being hingedly connected to the crank, whereby the controlling element will lie on the axle with the crank positioned below the plane of said axle and controlling element hinge connection to the arms and whereby the crank at its front may be manually moved upward to thereby release the locking means.

3. A device as recited in claim 1 including, said carrying wheels having an axle, spaced apart brackets secured to said box on which said axle is mounted, the axle having a length and positioned whereby the wheels will be positioned substantially under the box and a short distance in front of the center of gravity.

4. A feed truck of the character described comprising, a feed box, transversely spaced depending brackets secured to the bottom of said box forward of the longitudinal center of the box, an axle mounted on said brackets having rotatably mounted on the ends thereof carrying wheels, said wheels being positioned under the box, an arm transversely hinged at its upper ends to the rear end of said box, a relatively small wheel transversely rotatably mounted on the lower end of said arm, a controlling element forming a detachable connection between the arm and axle, means whereby said controlling element will automatically engage the axle when the box is raised to a horizontal position, means whereby pressure on the rear end of said controlling element will permit said arm to swing rearwardly and upwardly to thereby lower the rear end of the box.

5. A feed truck of the character described comprising, a feed box, its rear end extending from the bottom upwardly and rearwardly normally at substantially a 45 degree angle and having a hand gripping means adjacent the top thereof, transversely spaced main carrying wheels rotatably mounted on said box adjacent the longitudinal center of the bottom of the box, an arm transversely hinged at its upper end to the rear end of the bottom of the box, a relatively small carrying wheel transversely rotatably mounted on the lower end of said arm, an elongated element pivotally mounted near its rear end to said arm and adapted to be detachably anchored at its front end to normally hold the arm in a vertical position and the box generally in a longitudinal horizontal position, means whereby foot pressure on the rear end of said elongated element will free the front end thereof and permit said arm to swing on its pivot to thereby lower the rear end of the box for convenient forking or shoveling feed therefrom.

6. A feed truck of the character described comprising, a feed box, its rear panel being rigidly secured to the side panels of the box and at near a 45 degree angle to the bottom of the box, transversely spaced brackets secured to the bottom of said box adjacent the longitudinal center thereof, an axle secured to said brackets, carrying wheels rotatably mounted on the ends of said axle, said brackets having a height and positioned whereby the carrying wheels are positioned under the box, transversely spaced arms transversely hinged at their upper ends to the box and near the rear end of the box, wheels transversely rotatably mounted on the lower ends of the arms, a positioning element hingedly connected near its rear end to the arms, said positioning element having a goose neck at its forward end, a forwardly extending crank mounted on said axle and being hingedly connected to the forward end of the goose neck, said crank being positioned below the plane of said axle and the elements hinged connections to the arms when the goose neck lies on the axle to thereby hold the arms in a vertical position and the box generally in a horizontal position, means whereby the operator can apply foot pressure to the rear end of the element to release the front end of the element and permit said second wheels to swing rearwardly and upwardly on the axis of the arms to thereby lower the rear end of the box.

JOHN B. OLSON.

REFERENCES CITED

The following references are of record in the file of this patent:

UNITED STATES PATENTS

| Number | Name | Date |
|---|---|---|
| 471,042 | Warren | Mar. 15, 1892 |
| 1,554,903 | Beatty | Sept. 22, 1925 |
| 1,790,319 | Rall | Jan. 27, 1931 |
| 2,301,076 | Palmer | Nov. 3, 1942 |